US010162527B2

(12) United States Patent
Abe et al.

(10) Patent No.: US 10,162,527 B2
(45) Date of Patent: *Dec. 25, 2018

(54) SCALABLE AND EFFICIENT ACCESS TO AND MANAGEMENT OF DATA AND RESOURCES IN A TIERED DATA STORAGE SYSTEM

(71) Applicant: International Business Machines Corporation, Armonk, NY (US)

(72) Inventors: Atsushi Abe, Ebina (JP); Takashi Ashida, Yamato (JP); Mathias Bjoerkqvist, Rueschlikon (CH); Tohru Hasegawa, Tokyo (JP); Takeshi Ishimoto, Kawasaki (JP); Hiroshi Itagaki, Yokohama (JP); Martin Petermann, Zurich (CH); Slavisa Sarafijanovic, Adliswil (CH); Thomas D. Weigold, Thalwil (CH)

(73) Assignee: International Business Machines Corporation, Armonk, NY (US)

(*) Notice: Subject to any disclaimer, the term of this patent is extended or adjusted under 35 U.S.C. 154(b) by 24 days.

This patent is subject to a terminal disclaimer.

(21) Appl. No.: 15/682,270

(22) Filed: Aug. 21, 2017

(65) Prior Publication Data
US 2017/0344268 A1 Nov. 30, 2017

Related U.S. Application Data

(63) Continuation of application No. 14/832,925, filed on Aug. 21, 2015, now Pat. No. 9,772,775.

(51) Int. Cl.
*G06F 12/00* (2006.01)
*G06F 3/06* (2006.01)
*G06F 12/08* (2016.01)

(52) U.S. Cl.
CPC ............ *G06F 3/0605* (2013.01); *G06F 3/061* (2013.01); *G06F 3/067* (2013.01); *G06F 3/0611* (2013.01);
(Continued)

(58) Field of Classification Search
CPC ...... G06F 3/0605; G06F 3/061; G06F 3/0644; G06F 3/0647; G06F 3/067; G06F 12/08;
(Continued)

(56) References Cited

U.S. PATENT DOCUMENTS 6,269,382 B1 7/2001 Cabrera et al.
7,124,179 B1 10/2006 Bauer et al.
(Continued)

OTHER PUBLICATIONS

IBM, "IBM Spectrum Archive Enterprise Edition: Improve efficiency and reduce costs for long-term, tiered storage," Overview, Features & benefits, and Specifications webpages retrieved from http://www-03.ibm.com/systems/storage/tape/ltfs-ee/index.html, Jan. 2015, 3 pages.
(Continued)

*Primary Examiner* — Matthew Bradley
(74) *Attorney, Agent, or Firm* — Zilka-Kotab, P.C.

(57) ABSTRACT

A system according to one embodiment includes a processor and logic integrated with and/or executable by the processor. The logic is configured to cause the processor to store hierarchically-organized global configuration information for each node and each tape library resource in a storage cluster to at least one memory accessible by each node of the storage cluster. The storage cluster includes at least one tape library. Also, the logic is configured to cause the processor to migrate data to and/or recall data from a tape cartridge pool within a tape library, using the hierarchically-organized global configuration information and via a node which has access to the tape cartridge pool, in response to receiving a migration and/or recall request at any node of the storage
(Continued)

cluster. Other systems, methods, and computer program products for management of data and resources in a tiered data storage system are described in more embodiments.

18 Claims, 7 Drawing Sheets

(52) U.S. Cl.
CPC .......... *G06F 3/0644* (2013.01); *G06F 3/0647* (2013.01); *G06F 3/0649* (2013.01); *G06F 3/0685* (2013.01); *G06F 12/08* (2013.01); *G06F 2212/1016* (2013.01); *G06F 2212/154* (2013.01); *G06F 2212/213* (2013.01); *G06F 2212/263* (2013.01)

(58) Field of Classification Search
CPC ....... G06F 2212/1016; G06F 2212/154; G06F 2212/213; G06F 2212/263
See application file for complete search history.

(56) References Cited

U.S. PATENT DOCUMENTS

| | | |
|---|---|---|
| 8,214,584 B2 | 7/2012 | Johnson |
| 8,601,307 B2 | 12/2013 | Peters et al. |
| 9,772,775 B2 | 9/2017 | Sarafijanovic et al. |
| 2012/0226689 A1 | 9/2012 | Bolton et al. |
| 2014/0207760 A1 | 7/2014 | Barron et al. |
| 2017/0052706 A1 | 2/2017 | Sarafijanovic et al. |

OTHER PUBLICATIONS

IBM, "IBM data protection and data recovery: Lower backup infrastructure costs by up to 38 percent," Overview webpage retrieved from http://www-01.ibm.com/software/tivoli/csi/backup-recovery/, Jan. 2015, pp. 1-2.
OPENSTACK, "Welcome to Swift's documentation!" OpenStack Cloud Software Documentation and Overview webpage retrieved from http://docs.openstack.org/developer/swift/, Jan. 2015, pp. 1-3.
ORACLE, "Tape I/O Horizontal Scalability with Oracle Hierarchical Storage Manager 6.0," Oracle Brief retrieved from http://www.oracle.com/us/products/servers-storage/storage/storage-software/sb-storagetek-sam-horizontal-2259412.pdf, Jan. 2015, 3 pages.
ORACLE, "LTFS Archiving with Oracle Hierarchical Storage Manager 6.0," Oracle Brief retrieved from http://www.oracle.com/us/products/servers-storage/storage/storage-software/sb-storagetek-sam-ltfs-2259405.pdf, Jan. 2015, 3 pages.
Schmuck et al., "GPFS: A Shared-Disk File System for Large Computing Clusters," Proceedings of the 1st USENIX Conference on File and Storage Technologies, USENIX Association, Jan. 28-30, 2002, pp. 1-15.
SNIA, "Linear Tape File System (LTFS) Format Specification," SNIA Technical Position, Dec. 21, 2013, pp. 1-69.
Koltsidas et al., "Seamlessly integrating disk and tape in a multi-tiered distributed file system," 2015 IEEE 31st International Conference on Data Engineering (ICDE), Apr. 13-17, 2015, pp. 1328-1339.
Sarafijanovic et al., U.S. Appl. No. 14/832,925, filed Aug. 21, 2015.
Non-Final Office Action from U.S. Appl. No. 14/832,925, dated Jan. 30, 2017.
Notice of Allowance from U.S. Appl. No. 14/832,925, dated May 22, 2017.
List of IBM Patents or Patent Applications Treated As Related.

SCALABLE AND EFFICIENT ACCESS TO AND MANAGEMENT OF DATA AND RESOURCES IN A TIERED DATA STORAGE SYSTEM

BACKGROUND

The present invention relates to a data storage system, and more specifically, this invention relates to efficient access to and management of data and resources in a tiered data storage system.

Tape-based data storage systems may include one or more tiers for storing data to tape media, and are typically used for storing and accessing large amounts of infrequently accessed data. This type of system may include a very large number of tape storage media (tape cartridges) for storing data, many tape drives to mount the tape cartridges when access to data on a particular tape cartridge is desired, and many servers (nodes), each server being connected to a limited number of the tape drives, for data access, i.e., for writing data to or reading data from the tape cartridges.

The tape drives and the tape cartridges are contained within tape libraries and each node that is connected to a tape drive of a tape library is able to access any tape cartridges contained within that tape library. However, because the number of tape drives in a tape library is typically much less than the number of tape cartridges, access to data stored to tape may require unwinding and unmounting a tape cartridge already in a tape drive in order to mount a different tape cartridge that has the data of interest stored thereon. Then, the tape cartridge is positioned to the data of interest.

Unmounting and mounting tape cartridges takes a long time when compared to storing data to or accessing data from an already-mounted tape cartridge. When mounting and/or unmounting is performed too often, it significantly decreases utilization of the tape drives for reading and writing, and consequently decreases the overall system throughput and request servicing capacity. This increases the average data access waiting time. Repositioning within the tape cartridge may also take a long time when not jointly optimized for multiple requests. These delays add up and decrease the overall efficiency of the data storage system.

SUMMARY

A system according to one embodiment includes a processor and logic integrated with and/or executable by the processor. The logic is configured to cause the processor to store hierarchically-organized global configuration information for each node and each tape library resource in a storage cluster to at least one memory accessible by each node of the storage cluster. The storage cluster includes at least one tape library. Also, the logic is configured to cause the processor to migrate data to and/or recall data from a tape cartridge pool within a tape library, using the hierarchically-organized global configuration information and via a node which has access to the tape cartridge pool, in response to receiving a migration and/or recall request at any node of the storage cluster.

A computer program product according to one embodiment includes a computer readable storage medium having program instructions embodied therewith. The embodied program instructions are executable by at least one processor of at least one node of a storage cluster to cause the at least one processor to store hierarchically-organized global configuration information for each node and each tape library resource in a storage cluster to at least one memory accessible by each node of the storage cluster by the at least one processor. The storage cluster includes at least one tape library. Also, the embodied program instructions are executable by the at least one processor to cause the at least one processor to migrate data to and/or recall data from a tape cartridge pool within a tape library, using the hierarchically-organized global configuration information and via a node which has access to the tape cartridge pool, in response to receiving a migration and/or recall request at any node of the storage cluster.

A method according to one embodiment includes storing hierarchically-organized global configuration information for each node and each tape library resource in a storage cluster to at least one memory accessible by each node of the storage cluster. The storage cluster includes at least one tape library. The method also includes storing, in response to receiving a migration request at any node of the storage cluster and using the global configuration information, by a first node of the storage cluster, data from a high availability (HA) memory to a tape cartridge pool within a first tape library. The first tape library is in electronic communication with the first node, and the tape cartridge pool includes one or more tape cartridges. Moreover, the method includes recalling, in response to receiving a recall request at any node of the storage cluster and using the global configuration information, by a second node of the storage cluster, the data from the tape cartridge pool within the first tape library. The first tape library is in electronic communication with the second node.

Other aspects and embodiments of the present invention will become apparent from the following detailed description, which, when taken in conjunction with the drawings, illustrate by way of example the principles of the invention.

DETAILED DESCRIPTION

Figure 1:
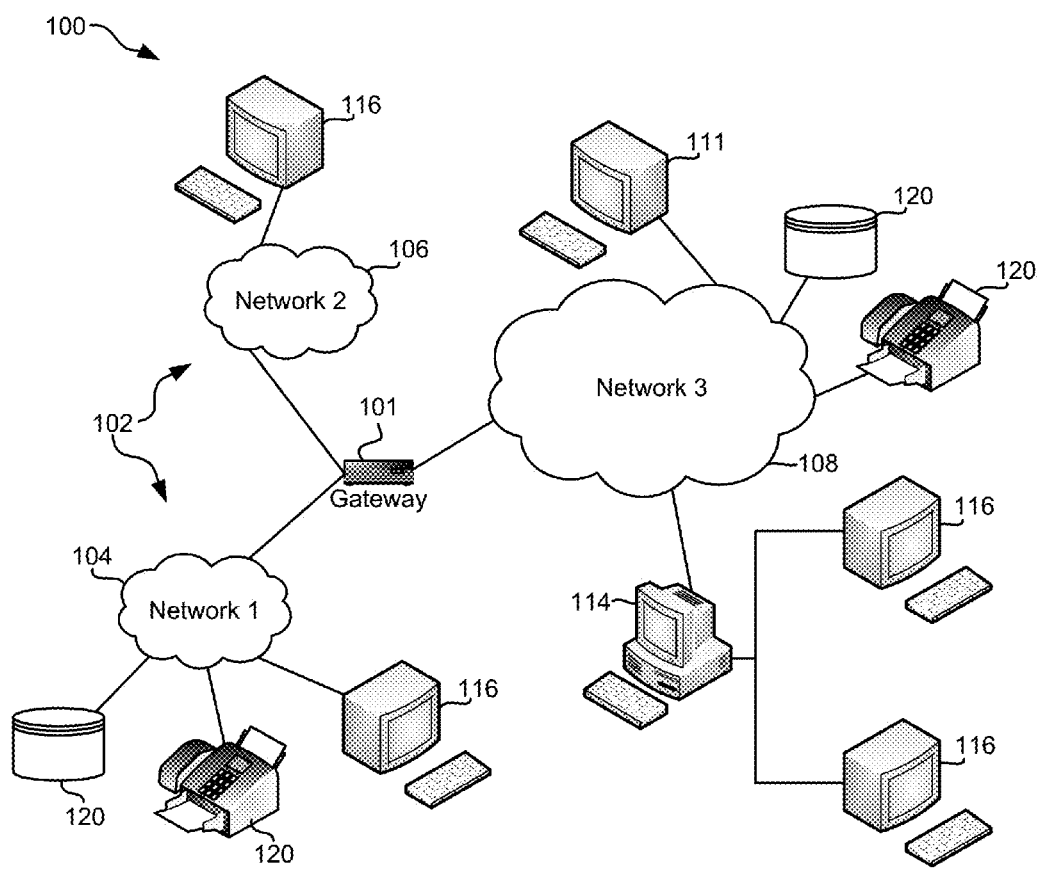
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for managing data and resources in a data storage system, such as a tiered data storage system.

In one general embodiment, a computer program product includes a computer readable storage medium having program instructions embodied therewith. The embodied program instructions are executable by at least one processor to cause the at least one processor to store, by the at least one processor of at least one node of a storage cluster, hierarchically-organized global configuration information for each node and each tape library resource in the storage cluster to at least one memory accessible by each node of the storage cluster, the storage cluster comprising at least one tape library. Program instructions are also executable by at least one processor of a first node of the storage cluster to cause the at least one processor to store, using the global configuration information, data from a high availability (HA) memory to a tape cartridge pool within a first tape library in response to receiving a migration request at any node of the storage cluster, wherein the first tape library is in electronic communication with the first node, and wherein the tape cartridge pool comprises one or more tape cartridges. Program instructions are also executable by at least one processor of a second node to cause the at least one processor to recall, using the global configuration information, the data from the tape cartridge pool within the first tape library in response to receiving a recall request at any node of the storage cluster. The first tape library is in electronic communication with the second node. The second node and the first node may be the same node and/or different nodes.

In another general embodiment, a system includes a processor and logic integrated with and/or executable by the processor, the logic being configured to store hierarchically-organized global configuration information for each node and each tape library resource in a storage cluster to at least one memory accessible by each node of the storage cluster, the storage cluster comprising at least one tape library. Logic is also configured to store, using the global configuration information and using a first node of the storage system, data from a high availability (HA) memory to a tape cartridge pool within a first tape library in response to receiving a migration request at any node of the storage cluster. The first tape library is in electronic communication with the first node, and the tape cartridge pool comprises one or more tape cartridges. Logic is also configured to recall, using the global configuration information and using a second node of the storage system, the data from the tape cartridge pool within the first tape library in response to receiving a recall request at any node of the storage cluster. The first tape library is in electronic communication with the second node. The second node and the first node may be the same node and/or different nodes.

In another general embodiment, a method includes storing hierarchically-organized global configuration information for each node and each tape library resource in a storage cluster to at least one memory accessible by each node of the storage cluster, the storage cluster comprising at least one tape library. The method further includes migrating and/or recalling, using the hierarchically-organized global configuration information, at a node which has access to the tape cartridge pool, data to and/or from a tape cartridge pool within a first tape library in response to receiving a migration and/or recall request at any node of the storage cluster.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
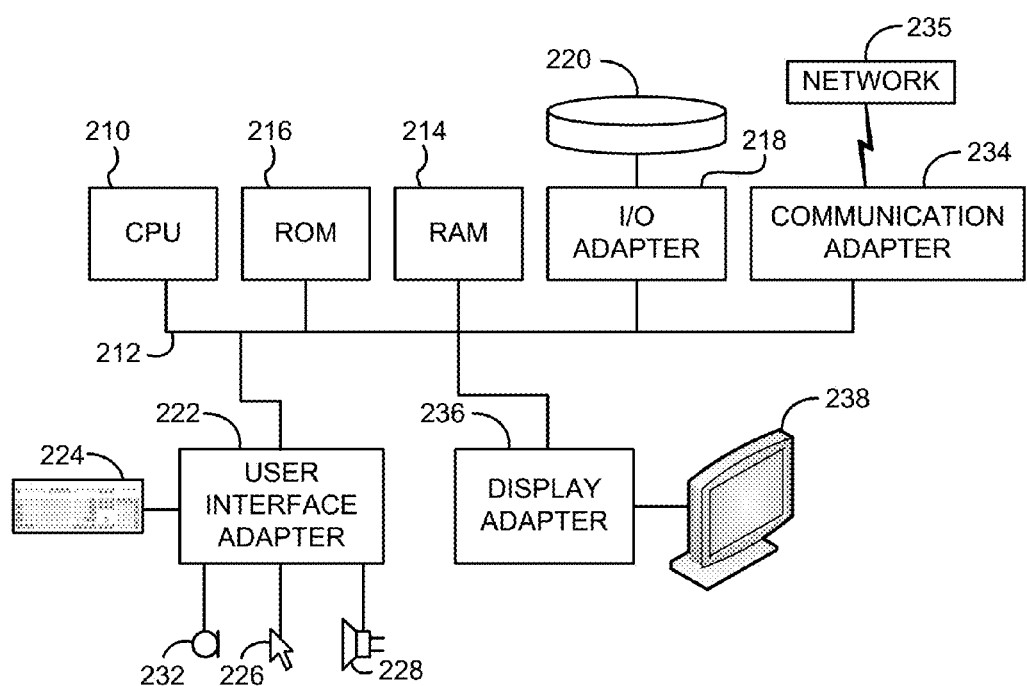
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
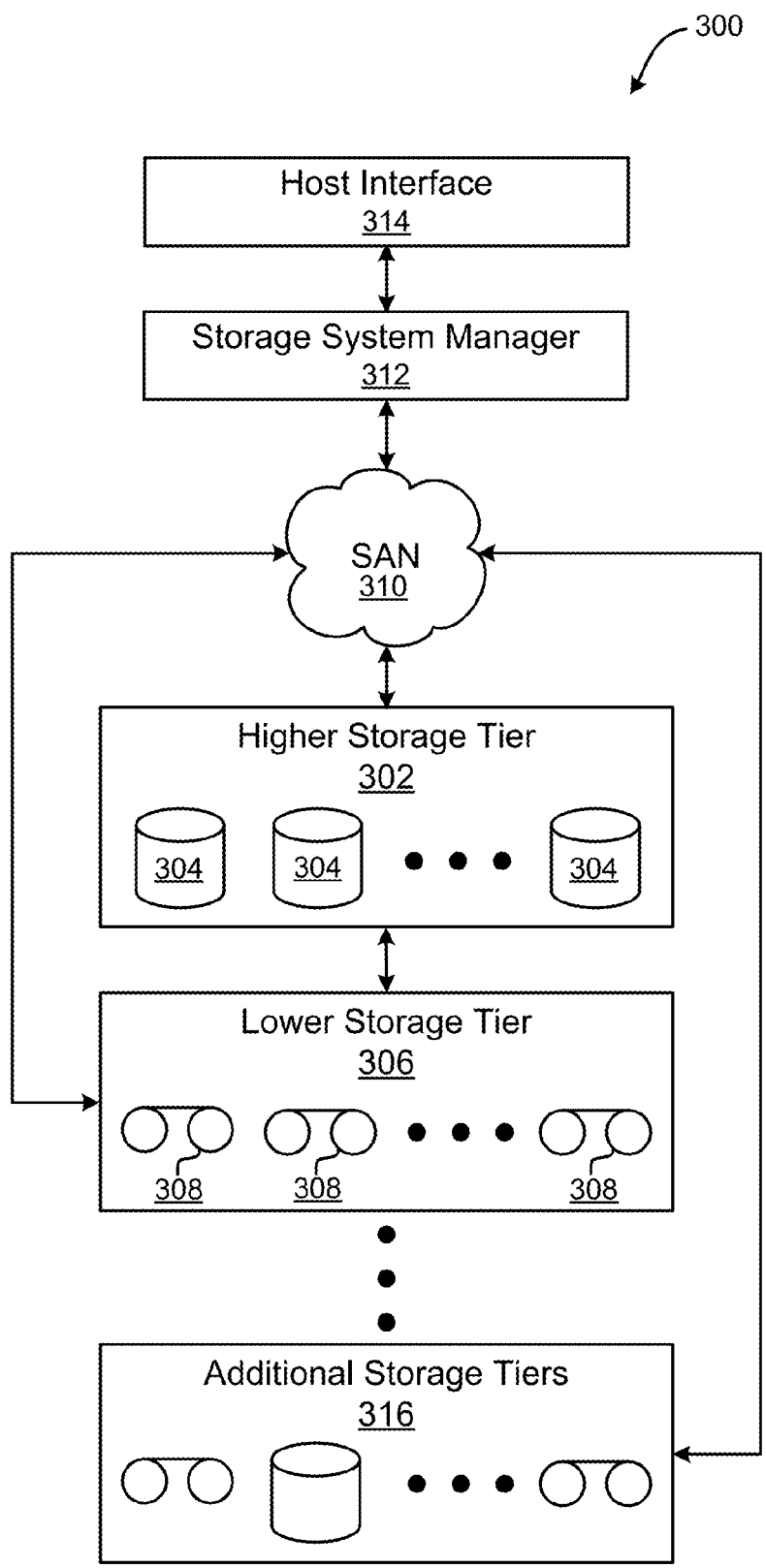
FIG. 3 illustrates a data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the storage system 300. Also, any of the higher storage tiers 302 and/or the lower storage tiers 306 may include a combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

To increase tape drive utilization and overall system performance, access requests to the tape cartridges may be queued and served in a manner which takes into consideration both tape cartridge mounts and media repositioning for data access within a cartridge.

However, in large data storage systems that include multiple tape libraries, not all cartridges typically are accessible by all nodes. Moreover, the amount of requests and resources to manage is very large. When attempting to access tape data, both the cartridge(s) and the node(s) that are used for that data access is determined. In addition, it may be beneficial to track and utilize the mount state of the tape cartridges and the tape drives that may be used for the data access, in order to queue and dispatch the requests efficiently.

Therefore, to improve efficiency of the data storage system, a request and the tape resources it requires should be managed to not take an inordinate amount of time or too much of a node's processing or memory resources, and that a satisfying maximum and/or average request response time and a good utilization of drives are achieved, e.g., it is desirable to store the data on tape in a standard tape file system format and have individual access to each file, which may result in a very high rate of individual file requests in the system that are dispatched to the tape drives fast enough to achieve an acceptable drive bandwidth utilization.

In a large-scale multi-library system, simplified approaches, such as centrally collecting and managing all or a majority of metadata, requests, and resource information, seem inappropriate. It is difficult to collect all the required information in a timely manner and the communication overhead for such action is too large. Also, each request would use the central component, which results in neither a scalable nor a reliable approach. Therefore a more appropriate solution has been developed.

Requests to be processed may include not only migrating data from disk to tape or recalling data from tape to disk, but may also include operations such as reconciling metadata stored on tape to make it consistent with disk file metadata, reclaiming the unusable space of a tape cartridge that contains deleted, i.e., unreferenced data by moving only the referenced data to another tape cartridge and formatting the original tape cartridge as empty, importing a tape cartridge by creating disk file index nodes (inodes) and associating those with tape data, exporting a tape cartridge or a pool of tape cartridges with previously migrated data therefrom, exporting specified disk data on newly written tape cartridges, etc.

Conventional systems that attempt to address efficiency in managing and accessing data stored to tape cartridges are either limited to single tape library use only use a centralized, and therefore not both efficient and scalable, solutions for managing resources and data requests. There is no mechanism available that allows for a scalable system to be efficiently implemented that manages many tape libraries synchronously.

In order to overcome the deficiencies in the prior art, a method is described herein according to multiple embodiments for efficiently managing tape data requests and resources in a data storage system having at least one tape library, and possibly many tape libraries in excess of 5 libraries, 10 libraries, 20 libraries, etc.

Two techniques are described herein that may be used independently or in combination. The first technique comprises configuring and using nodes and tape resources in a hierarchical structure so that global configuration information may be stored and accessed in an efficient and scalable manner.

In a first embodiment of the first technique, global configuration information is split into two or more portions so that the global configuration information may be stored and accessed independently from different servers in the data storage system for limited-size subsystems, e.g., for a storage system having one tape library. Furthermore, all the resources associated with the limited-size subsystem may be accessed and utilized independently.

In a second embodiment of the first technique, the global configuration information may be stored in a distributed manner using a reverse-hierarchy mapping. As explained in more detail later, this distributed storage technique allows for efficient processing of migration requests, and other requests related to a tape cartridge pool and/or an individual tape cartridge within a tape library.

The second technique comprises storing the tape cartridge and/or node resources information relevant for accessing data of a (pre)migrated file into an inode on disk, and using the stored file inode information to efficiently route and process the data access requests in a multi-library data storage system. This technique, which may be combined with the first technique in one or more embodiments, allows for efficient processing of recall requests.

In one embodiment, the disk file inode may be used to store, for each tape copy of the disk file data, some or all of the following information about the tape resources used during file migration: target cartridge identifier (ID), target library ID, target cartridge pool ID, node group ID for the group of nodes that may be used to access the tape cartridge, network address of the node used to further distribute the request, and network address of the node used to write to the cartridge. Each network address may be in any form known in the art and recognizable by the data storage system, such as an internet protocol (IP) address, a media access control (MAC) address, a uniform resource locator (URL) address, etc. The stored information may be used to efficiently route a request for accessing data stored on one or more tape cartridges toward the same tape library or toward the same access node. In one embodiment, the request may be routed without any further query about the configuration and the current state of the tape resource. In another embodiment, the request may be routed with a query to the configuration or state maintained separately for a limited subset of resources.

Clearly there are many possible embodiments that change some aspect of the inode and/or configuration information stored in the inode, each possible embodiment resulting in different levels of efficiency of processing routing requests and/or efficiency in using tape resources, which would be readily ascertained by one of ordinary skill upon reading the present descriptions.

In one representative embodiment, in which a cartridge ID and a library ID of a migrated disk file are stored into the file inode, some but not all of the nodes are connected to the tape drives of that single tape library. One node per library is configured to keep the configuration and state information of the resources for just that single tape library, and distributes any request that involves a tape cartridge from that tape library. When the migrated file is accessed for reading the data from tape, the library ID is read from the file inode, the distributor node network address is determined based on the library ID, and the request is routed to the distributor node along with the tape cartridge ID information. The distributor node ensures that the tape cartridge is mounted, or mounts the tape cartridge to a node, and distributes the request to the node in which the tape cartridge is mounted (mount node).

In one embodiment, migration requests may be routed in a similar fashion, assuming that tape cartridges are organized into tape cartridge pools, and a user or application submitting the migration request specifies the target tape cartridge pool and one or more tape library IDs or names mapped to those tape library IDs. Other requests that involve a cartridge pool or a specific cartridge, such as reconcile, reclaim, export, and import requests, in addition to pool ID and library ID, also specify the tape cartridge ID. These various IDs may be obtained from the inode in one embodiment, or from a user, such as via a command line input, according to another embodiment.

In one embodiment, the configuration information that is globally accessed in order to process requests may comprise a mapping from the tape library ID to the distributor node network address. In this embodiment, the configuration information is very limited in size, and may be split per tape library, thereby ensuring that it is not changed frequently. The configuration information may be stored, e.g., in the data storage system, to make it highly available for all nodes. In this way, the configuration information is easy to manage and efficient to access. All other configuration and state information that is used for processing requests may be split according to tape library to which it is associated, in one embodiment. This makes the system fully scalable in terms of the number of tape libraries that may be supported, thus addressing the drawbacks of the prior art approaches regarding request handling efficiency and ability or scalability in managing multiple tape libraries.

In various embodiments, some or all of the configuration information may be stored so as to be globally accessible by any node in the data storage system. However, as explained previously, a part of the configuration information may be accessed globally at the time of processing requests, and the parts of the configuration information related to a single library may be loaded locally into the memory of the node(s) distributing the requests within the tape library and accessed locally. Run time configuration updates may be effected both locally in memory and in the persistently-stored globally accessible copy of the configuration information in some approaches.

The global configuration information may comprise node access information configured to allow each node of the data storage system to access all other nodes of the data storage system. Furthermore, the global configuration information may comprise resource information configured to allow each node of the data storage system to access its own resources, and in some further approaches, the resources of all other nodes of the data storage system. Each tape library includes resources available to facilitate access to the data stored to the tape library. In addition, each node includes various resources configured to aid in the access of the other nodes and tape resources.

In another representative embodiment, only the unique cartridge ID may be stored in the disk file inode, with the configuration information being stored in a distributed manner using a reverse-hierarchy mapping. In this embodiment, the reverse-hierarchy mapping configuration is stored into a clustered file system by storing a symbolic link for each tape cartridge ID, tape cartridge pool ID, and tape library ID, all indexed by ID in one directory per ID type. Each tape cartridge link points to its higher level tape cartridge pool link, each tape cartridge pool link points to its higher level tape library link, and each tape library link points to a file that defines the network address of the distributor node for that tape library. A distributor node has the same functionality as in the previously described embodiment. When a migrated file is accessed for reading, the tape cartridge ID is obtained from the file inode, then its configuration symbolic link is read and this provides the network address of the associated distributor node.

Instead of always reading the configuration information from the distributed file system, any pertinent previously read information may be cached locally in one embodiment, e.g., it may be cached on a local file system, it may be kept in memory by a service running on each node, etc., so that each query does not require a read from the distributed file system. When the cached information is outdated, the request may fail, in which case the configuration information may be retrieved from the distributed file system and the request retried.

In this embodiment, the size of the data storage system also scales with the number of tape libraries, because the number of nodes and the size of the clustered file system may grow with the number of tape libraries used, and this allows for efficient access to global configuration information used for routing the requests, as well as loading specific information for a tape library into a memory of the distributor node in embodiments that use a distributor node. Furthermore, compared to the previous embodiment, changing the configuration may be less disturbing to processing requests because the required locking for a configuration update may be localized. Moreover, locking may be avoided entirely by using request retries, e.g., when a cartridge is re-assigned to another pool in the same or a different tape library, only one symbolic link is changed and this symbolic link may be locked for this purpose, and inode information does not need to be updated.

As previously mentioned, the efficient management of tape data requests and resources is achieved, by one of two techniques, or a combination of both techniques, in various embodiments. The first technique is configuring and using nodes and tape resources in a hierarchical way so that the global configuration information is stored and accessed in an efficient and scalable manner. The second technique is storing the tape or node resource information relevant for accessing data of a (pre)migrated file into the file inode on disk, and using the stored inode information to efficiently route and process the data access requests in a multi-library data storage system.

Figure 4:
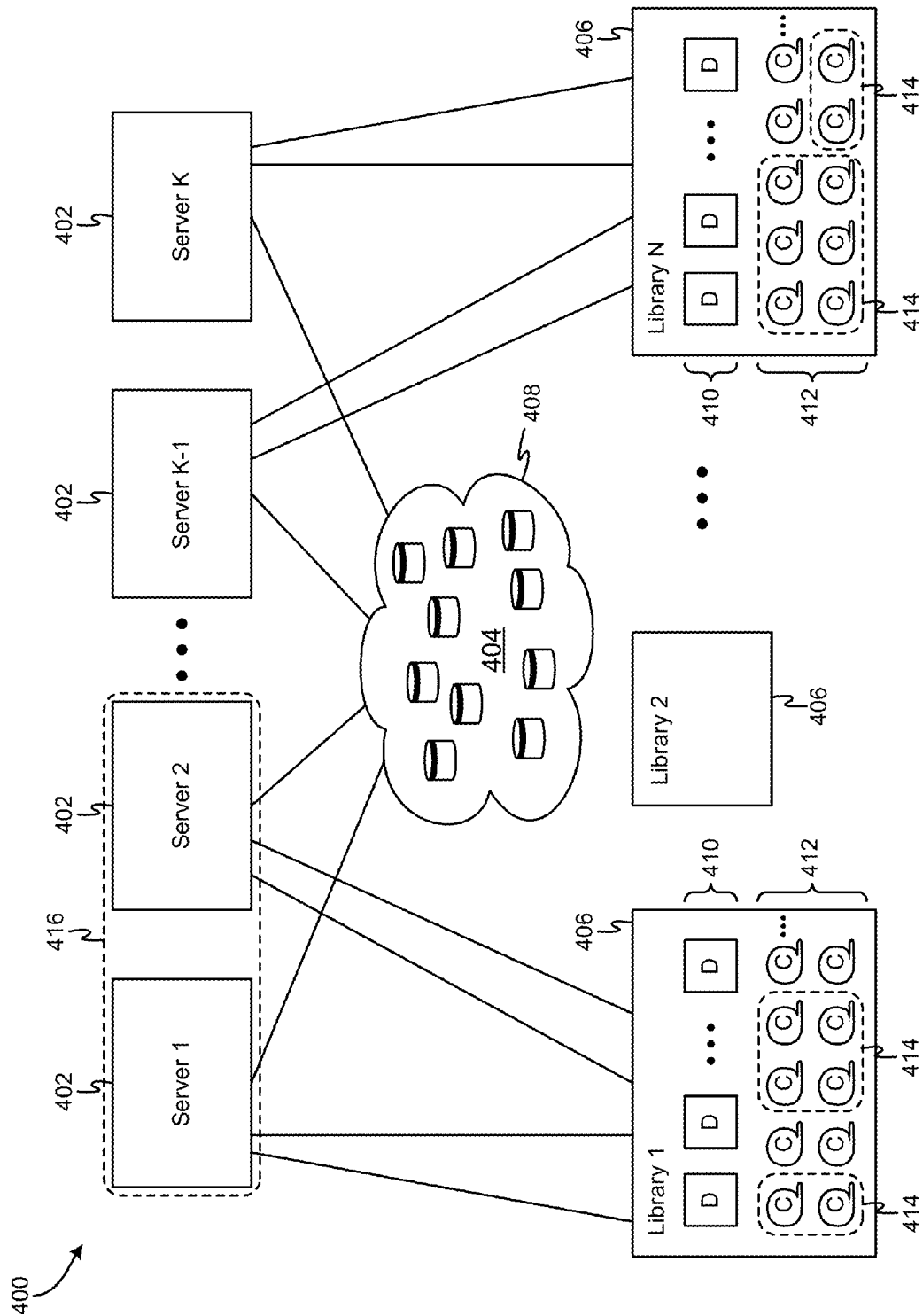
FIG. 4 shows a storage cluster according to one embodiment.

Now referring to FIG. 4, in a first embodiment, a storage cluster 400 comprises a plurality of nodes 402, each node 402 being in electrical communication with high-availability (HA) memory 404, such as disk-based storage, non-volatile random access memory (NVRAM), Flash memory, etc. The HA memory 404 may be managed by a storage area network (SAN) 408 or may be accessible to the plurality of nodes 402 in some other way, such as being connected directly to one or more nodes 402, provided via an interface, etc. Furthermore, each node 402 is in electrical communication with at least one tape library 406, and preferably a plurality of tape libraries 406.

A node 402 may be a server, such as Server 1, Server 2, etc., shown in FIG. 4, or it may be any other type of computing device capable of communicating with the HA memory 404 and/or the tape libraries 406, such as a host, a work station, a mainframe, etc.

Each tape library 406 comprises a plurality of tape cartridges 412 and one or more tape drives 410 configured to mount a tape cartridge 412 at any given time. Other support devices and machinery may be included in each tape library 406, as would be known to one of skill in the art, such as tape shuttle(s), tape cartridge storage slots, automated picker(s), etc.

The HA memory 404 comprises any form of data storage media that has faster access times than tape-based storage media, thereby enabling data which needs to be accessed frequently and/or quickly to be stored to the HA memory 404, while less frequently accessed data and/or data that is suitable for slower access times may be stored to the tape cartridge(s) 412 of one of the tape libraries 406.

In storage cluster 400, each node 402 is capable of accessing any file on the HA memory 404, e.g., via use of a clustered disk file system, a cluster comprising disk-based and NVRAM memory, a Flash memory cluster, a SAN comprising hard disk and/or NVRAM memory, etc. When the file data is stored to tape media in a tape library 406, only the nodes 402 attached to the particular tape library 406 that stores the target tape cartridge 412 may be used for recalling the data from tape media to HA memory 404. The storage cluster 400 may be configured in a hierarchical manner in one embodiment.

One such hierarchical manner is described below according to the first embodiment, with the first association generally being in a higher hierarchy level than the last association. The association is denoted by the number in parenthesis ( . . . ), and the number of each type of structure (e.g., cluster, library, node, etc.) is indicated in brackets [ . . . ]. Each association denotes a first structure, and how it may be related to lower level structures, e.g., a node group related to nodes contained in the node group, a tape library related to the node groups within the tape library, etc.

Storage cluster [1]↔[N≥1] Tape libraries (1)

Tape library [1]↔[N≥1] Node groups (2)

Tape library [1]↔[N≥0] Drives not assigned to nodes (3)

Tape library [1]↔[N≥0] Cartridges not assigned to pools (4)

Node group [1]↔[N≥1] Nodes (5)

Node [1]↔[N≥1] Tape drives (6)

Node group [1]↔[N≥0] Tape cartridge pools (7)

Tape cartridge pool [1]↔[N≥0] Tape cartridges (8)

The nodes 402 of the storage cluster 400 attached to one tape library 406 may be organized into node groups 416. Creating multiple node groups 416 per tape library 406 is an optional feature. Therefore, according to one embodiment, a default setting may dictate that all nodes 402 attached to one tape library 406 form a single default node group associated with that tape library 406. Any such configuration may be performed by a system administrator, a storage network administrator, or some other authorized individual, and may be selectable and modified at any time.

The tape cartridges 412 are organized into tape cartridge pools 414. A tape cartridge pool 414 may be specified as the target pool for migration of one or more files, which may be represented as a list of files. If multiple tape cartridge pools 414 are specified, one tape copy is created in each tape cartridge pool 414 according to one embodiment, e.g., a primary tape copy is created in the primary tape cartridge pool which is in the first tape library, such as Library 1, and a redundant tape copy is created in a secondary tape cartridge pool which is in a second tape library, such as Library N.

In this configuration, the tape cartridge pools 414 and nodes 402 do not span across more than one tape library 406. When a new tape cartridge pool 414 is created, and there is only one node group 416 created for the associated tape library 406, then the tape cartridge pool 414 may be automatically assigned to that node group 416; otherwise, an administrator may be asked to explicitly assign the tape cartridge pool 414 to a node group 416.

For example, an administrator might want to create multiple node groups within a tape library when there is a desire to split node and drive resources used by different pools owned by different users or user groups. Also, the administrator may assign a primary designation and a redundant designation to different node groups, which may act to improve data availability in case of node failures, when two different replicas of data are stored within one tape library.

A representation of the associations (1-8) described above may be stored in globally accessible configuration databases, e.g., one database per tape library 406. These globally accessible configuration databases may be used for efficiently routing and dispatching requests to the proper resource.

In a particular implementation, one node 402 per tape library 406 may be configured to load the configuration information denoted by associations (2-8) related to its own tape library 406 into a locally accessible memory, in order to keep the configuration and state information of the resources for just that one tape library 406, and to accept and further distribute requests that involve tape cartridges 412 and tape cartridge pools 414 from that tape library 406. Such a configuration implies an additional entry in the globally accessible configuration information, represented as:

Tape library [1]↔[1] Distributor node (9)

A migration request needs to specify the target tape cartridge pool and tape library. In order to effectively identify which tape library and tape cartridge pool is being specified, unique names and/or identifiers (IDs) may be used. Each ID may be a numeric, alphabetic, hexadecimal, or alphanumeric string of sufficient length to uniquely identify all distinct elements of the various components in a storage cluster. Then, using the globally accessible configuration information represented by association (9), the tape library of the migration request may be mapped to the distributor node (e.g., to its network address). In this way, the request is efficiently routed to the distributor node along with tape cartridge ID information. The distributor node ensures that the tape cartridge is mounted, or mounts the tape cartridge to a node, and distributes the request to the node in which the tape cartridge is mounted (the "mount node").

In this embodiment, the tape cartridge ID and a tape library ID of a migrated disk file may be stored into the file inode. When the migrated file is accessed for reading the data from the tape cartridge, the tape library ID is read from the file inode, the distributor node network address is determined based on the tape library ID, and the request is routed to the distributor node along with the tape cartridge ID information. The distributor node ensures that the tape cartridge is mounted, or mounts the tape cartridge to a node, and distributes the request to the mount node.

Figure 5:
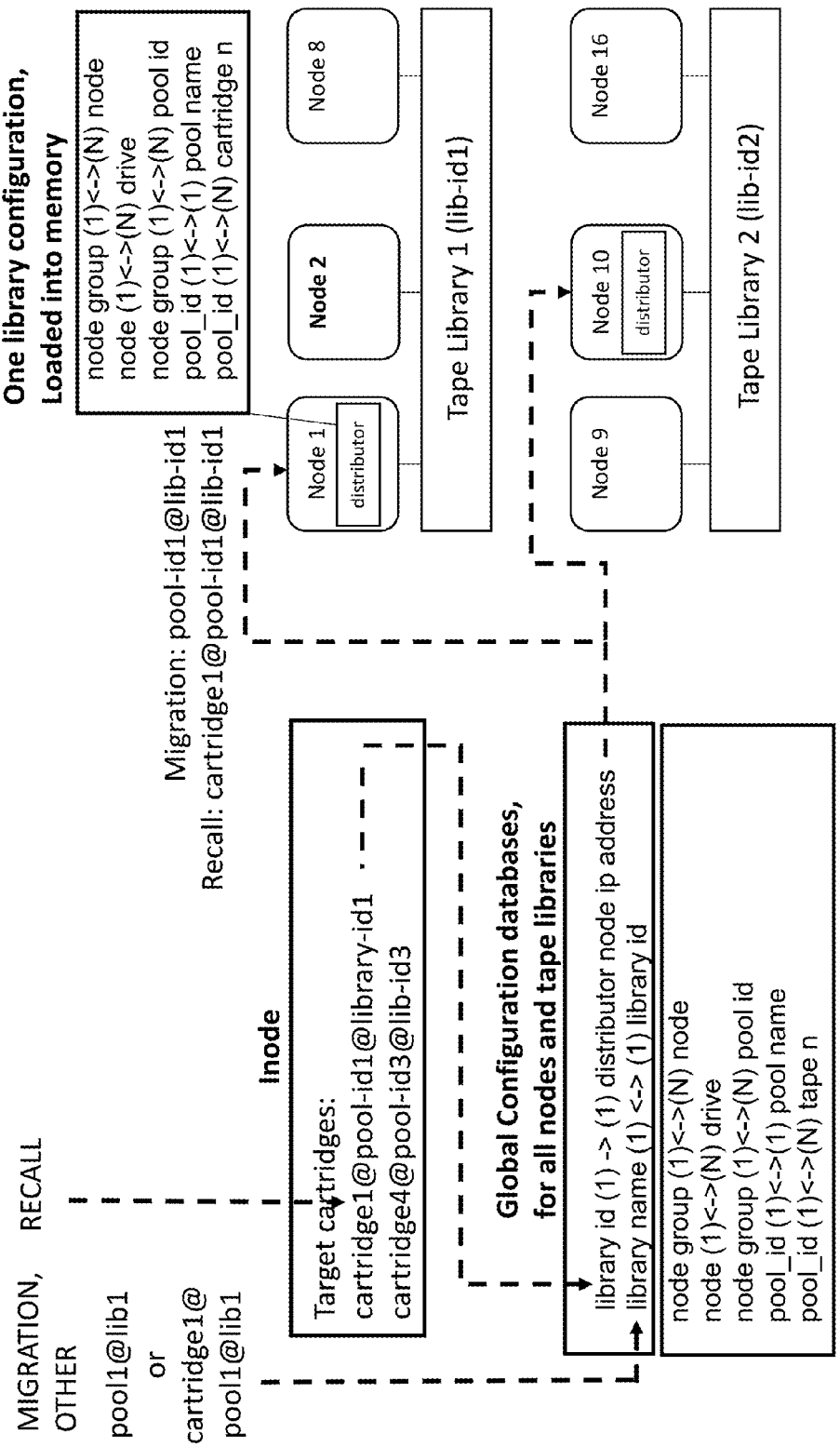
FIG. 5 shows a hierarchical configuration of a storage cluster and routing and distribution of requests therein, according to one embodiment.

The hierarchical configuration of a storage cluster and routing and distribution of requests therein is shown in FIG. 5 according to one embodiment. FIG. 5 shows that efficiently routing a request in a multi-library system is possible using tape cartridge, tape cartridge pool, and tape library information obtained from the inode and/or input from an administrator, Global Configuration information accessible from each node, a memory-loaded per library configuration information, etc.

In the embodiment shown in FIG. 5, the configuration information that is globally accessed while processing requests is very limited. In one embodiment, it may include the mapping from tape library ID to distributor node network address; therefore, this configuration information may be split per tape library, and does not change often. It may be stored, e.g., in the storage cluster to make it highly available for all nodes. In this way, it is easy to manage and efficient to access. All other configuration and state information that is used for processing requests may be split per tape library, which makes the system fully scalable in terms of the number of tape libraries that may be supported.

In another embodiment, when a file is migrated to multiple tape cartridge pools, e.g., to multiple tape cartridge pools, the request may be split into multiple portions corresponding to the number of tape cartridge pools. This split may be performed by the distributor node of the first tape cartridge pool. Any factor may be used in determining how to perform the split, and which aspects of the request are handled by the various tape cartridge pools, in various approaches. A later recall may be routed to the distributor node for the first tape cartridge pool corresponding to the first tape copy, or current state of the tape cartridge and tape drives may be queried and routing may be based on the obtained state.

In yet another embodiment, only a unique tape cartridge name (or tape cartridge ID) may be stored in the disk file inode, and the configuration information is distributed across multiple elements of the storage cluster, such as via a reverse-hierarchy mapping. The reverse-hierarchy mapping configuration may be stored into the storage cluster by storing a symbolic link for each tape cartridge, each tape cartridge pool, and each tape library ID, in one directory per structure type. Each tape cartridge link points to its associated tape cartridge pool link, each tape cartridge pool link points to its associated tape library link, and each tape library link points to a file that defines the network address of the distributor node for that tape library.

Figure 6:
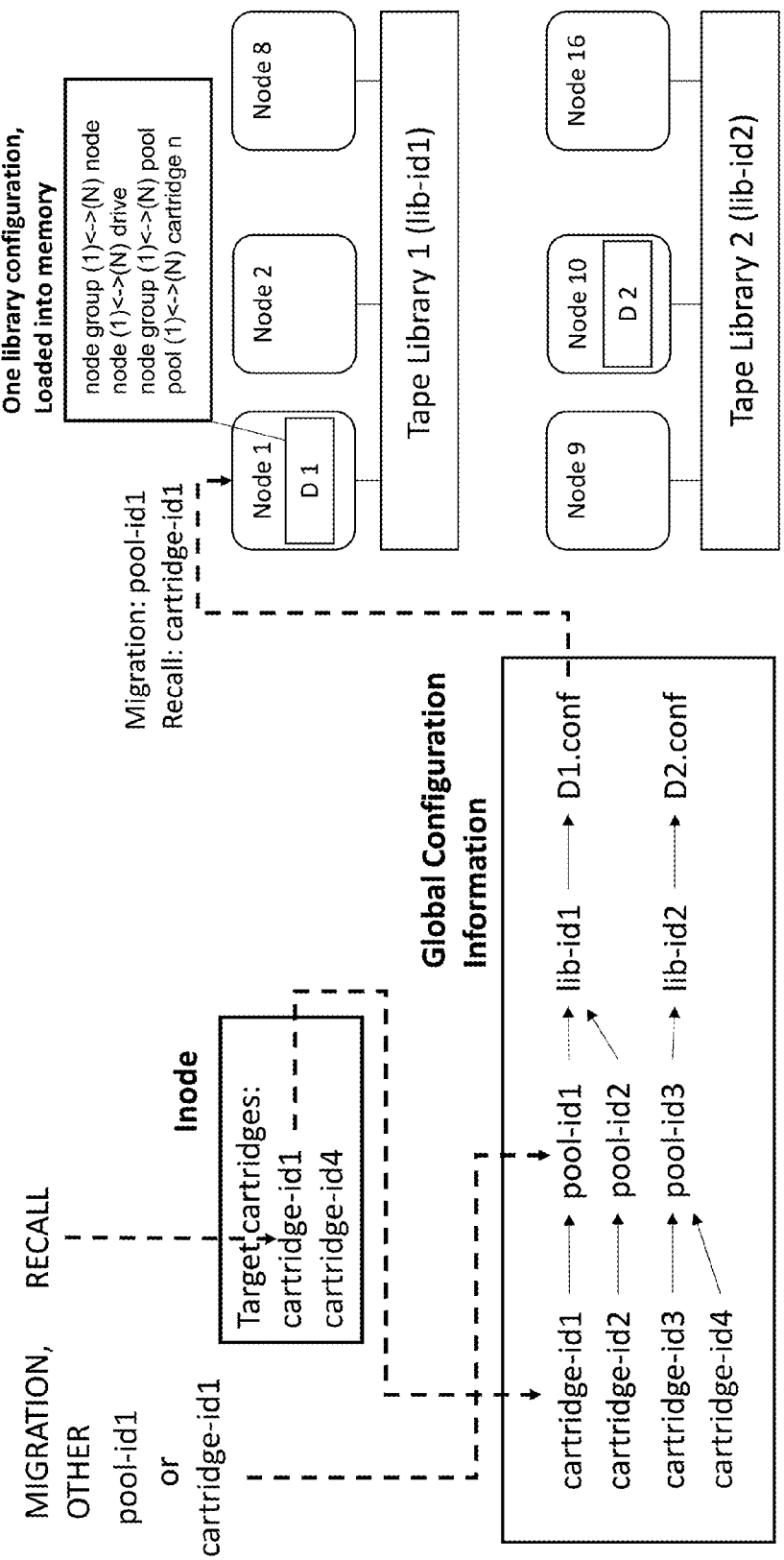
FIG. 6 shows request routing in a multi-library system according to one embodiment.

Now referring to FIG. 6, routing a request in a multi-library system is shown in an efficient manner according to one embodiment. This is accomplished using tape cartridge pool or tape cartridge information obtained from the inode and/or via input from an administrator, global configuration information accessible from each node and stored as a reverse-hierarchy mapping of symbolic links, a memory-loaded per library configuration information, etc.

In the embodiment shown in FIG. 6, a distributor node may be used in the same way as in the embodiment shown in FIG. 5. However, as shown in FIG. 6, when a migrated file is accessed for read, the tape cartridge name (or tape cartridge ID) is obtained from the file inode, then its configuration symbolic link is read which provides the network address of the distributor node.

By storing the configuration information in this way, scalability with the number of tape libraries is provided, because the number of nodes and the size of the storage cluster is able to grow with the number of tape libraries used. Furthermore, efficient access to the global configuration information used for routing the requests is provided, as well as loading tape library specific information into a distributor memory in approaches which rely on a distributor node. Additionally, it may allow for simpler reconfiguration since inode metadata does not need to be updated for each change, but might be more challenging to implement correctly.

In the storage clusters described herein, the distributor node may schedule request jobs to different nodes within its node group, according to one approach. In another approach, the distributor node may only forward the request jobs to the individual node (including itself) schedulers, and these individual schedulers then schedule the jobs. In the latter case, each scheduler is configured to obtain from the distributor node a temporary ownership for the tape drives and tape cartridges associated to the assigned jobs it will schedule next. It should be understood that even after the request jobs are routed to the final node that will execute those jobs by writing or reading a tape cartridge, proper scheduling is still useful because data access on tape is serialized in order to avoid unnecessary seeks.

In yet another embodiment, the inode information includes not only tape cartridge information, but also the network address of the node that may be used to distribute the recall. In this way, checking the globally accessible information is not needed for recall distribution, which makes the recall processing even more efficient. However, if the distributor gets replaced or if its network address changes, updating the inode information is performed to realign the pointers.

According to yet another embodiment, the inode information includes not only tape cartridge information, but also the IP address of the node that can be used to distribute the recall. This allows the recall to be distributed without checking any other configuration information, but the efficiency of resource use is limited since node and tape drives that may be used are limited to those of the node. If the nodes are connected to tape drives via a storage network, such as a fiber channel network using one or more fiber channel switches, tape drive usage flexibility is improved, but an additional mechanism to serialize tape cartridge writes and reads by different nodes may be implemented to handle this aspect.

Other combinations of inode composition (what is stored therein) and how the global configuration information is stored are also possible and contemplated, each providing multi-library support and scalability but with different levels of efficiency regarding the following key factors: routing and distributing requests, utilization of the tape resources, reconfiguration, and implementation complexity.

Figure 7:
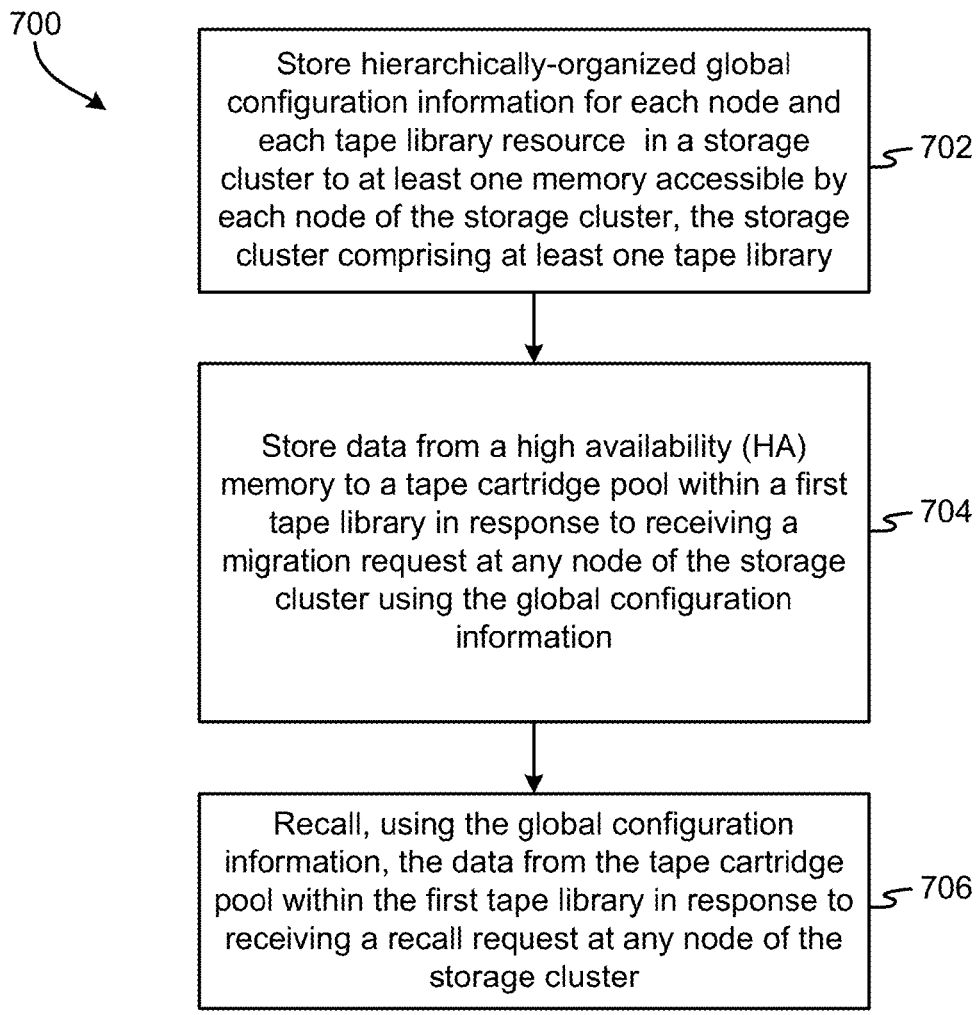
FIG. 7 shows a flowchart of a method according to one embodiment.

Now referring to FIG. 7, a flowchart of a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, a storage environment controller, an application installed on a device within a storage environment, or some other device having one or more processors therein. The processor, e.g., processing circuit(s), chip(s), and/or module(s) implemented in hardware and/or software, and preferably having at least one hardware component, may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where preferably hierarchically-organized global configuration information for each node and each tape library resource in a storage cluster is stored to at least one memory accessible by each node of the storage cluster. The global configuration information comprises a mapping that correlates each tape library ID to a network address for a distributor node, and may include information about only those nodes and resources relevant to the present operation, up to and including information about each and every node and/or resource. Moreover, the storage cluster includes one or more tape libraries, and the hierarchically-organized global configuration information for each node and each tape library resource in a storage cluster may be stored by one or more nodes of the storage cluster. The hierarchically-organized nature of the global configuration information is beneficial in that it significantly reduces the number of mounts and unmounts, as compared to a hash-based distributed storage system configuration, which does not work well with tape resources because it tends to require a significant number of mounts and unmounts.

In operation 704, data from a HA memory is stored to a tape cartridge pool within a first tape library in response to receiving a migration request at any node of the storage cluster, where the first tape library may be a library in one of the aforementioned storage clusters. Note that the migration request may be, but does not have to be, received on the same node as the node that migrates the data. The tape cartridge is identified within the first tape library using the global configuration information. In this system, the first tape library is in electronic communication with the first node, and the tape cartridge pool comprises one or more tape cartridges configured for storing data.

In one embodiment, the data may be stored to at least a first tape cartridge of the tape cartridge pool using the first node. When appropriate due to the size of the data to be stored, the data may be stored across two or more tape cartridges.

According to another embodiment, method 700 may include storing information related to the data object being migrated, such as metadata information, to an index node (inode) of the HA memory, the metadata information being configured to allow a later request to be forwarded to the second node. The later request may be for reading the data stored to at least the first tape cartridge, writing additional data to the first tape cartridge, etc. In a further embodiment, the information may be stored using a key-value HA distributed storage technique. As an option, the key may be determined from information unique to the data object such as inode or URL.

In operation 706, the data from the tape cartridge pool within the first tape library is recalled, using the global configuration information, in response to receiving a recall request at any node of the storage cluster. The recalling operation may be performed by any node, including the first node, or a second node, i.e., the first and second nodes may be the same one node, or different nodes. The node performing the recall should be connected to the first tape library, e.g., in electrical communication therewith via any suitable known connection configuration. In one approach, stored information related to the data, e.g., metadata information, may be used during the recall operation.

In one embodiment, method 700 may include storing and accessing the global configuration information for each node and tape resource associated with a tape library separately for each tape library of the storage cluster. In this way, only portions of the global configuration information that is usable for a particular tape library may be stored within the particular tape library to access the data stored therein, resources of the particular tape library, and any other usable information for efficient data access in the tape library by one or more nodes of the storage cluster.

In an alternate embodiment, method 700 may include storing and accessing the global configuration information for each node and tape library resource in the storage cluster in a distributed manner using a reverse-hierarchy mapping of the node and tape library resources in the storage cluster. The reverse-hierarchy mapping may provide links between each higher level structure to a lower level structure therebelow, such as tape library to tape cartridge pool(s) included therein, tape cartridge pool to tape cartridges included therein, etc.

According to another embodiment, method 700 may include receiving a request to perform data manipulation at one node of the storage cluster. The request to perform data manipulation may be one of: reconciliation, reclamation, import, export, or some other request for data manipulation known in the art. The method 700 may also include forwarding the request to perform data manipulation to an appropriate node that has access to the data referenced in the request to perform data manipulation based on the global configuration information.

In one embodiment, operation 704 in which the data from the HA memory is stored to the tape cartridge pool within the first tape library further includes forwarding the migration request from a receiving node to at least the first node prior to storing the data to at least the first tape cartridge.

According to another embodiment, the receiving node may use the global configuration information to identify the first node and a network address for the first node, such as an IP address of the first node.

In one embodiment, operation 706 in which the data from the tape cartridge pool within the first tape library is recalled may include forwarding the recall request to at least the first node based on the metadata information stored to the inode, and reading the data from at least the first tape cartridge using the first node. When the data is stored across more than one tape cartridge, each tape cartridge is read in proper order to obtain the extent of the data.

Any aspect of utilization and deployment of storing and managing data and resources in a tiered data storage system may be investigated and/or improved using the methods described herein in various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a processor and logic integrated with and/or executable by the processor, the logic being configured to cause the processor to:
store hierarchically-organized global configuration information for each node and each tape library resource in a storage cluster to at least one memory accessible by each node of the storage cluster, the storage cluster comprising at least one tape library; and
migrate data to and/or recall data from a tape cartridge pool within a tape library, using the hierarchically-organized global configuration information and via a node which has access to the tape cartridge pool, in response to receiving a migration and/or recall request at any node of the storage cluster.

2. The system as recited in claim 1, wherein the global configuration information comprises a mapping that correlates each tape library identifier (ID) to a network address for a distributor node.

3. The system as recited in claim 1, wherein the logic is further configured to cause the processor to:
receive a request to perform data manipulation at one node of the storage cluster; and
forward the request to perform data manipulation to an appropriate node that has access to the data referenced in the request to perform data manipulation based on the global configuration information.

4. The system as recited in claim 1, wherein the logic is further configured to cause the processor to store and access the global configuration information for each node and tape resource associated with a tape library separately for each tape library of the storage cluster.

5. A computer program product, the computer program product comprising a computer readable storage medium having program instructions embodied therewith, the embodied program instructions being executable by at least one processor of at least one node of a storage cluster to cause the at least one processor to:
store, by the at least one processor, hierarchically-organized global configuration information for each node and each tape library resource in a storage cluster to at least one memory accessible by each node of the storage cluster, the storage cluster comprising at least one tape library; and
migrate data to and/or recall data from a tape cartridge pool within a tape library, by the at least one processor, using the hierarchically-organized global configuration information, in response to receiving a migration and/or recall request at any node of the storage cluster.

6. The computer program product as recited in claim 5, wherein the global configuration information comprises a mapping that correlates each tape library identifier (ID) to a network address for a distributor node.

7. The computer program product as recited in claim 5, wherein the embodied program instructions are further executable to cause the at least one processor to:
receive, by the at least one processor, a request to perform data manipulation at one node of the storage cluster; and
forward, by the at least one processor, the request to perform data manipulation to an appropriate node that has access to the data referenced in the request to perform data manipulation based on the global configuration information.

8. The computer program product as recited in claim 5, wherein the embodied program instructions are further executable to cause the at least one processor to store and access, by the at least one processor, the global configuration information for each node and tape resource associated with a tape library separately for each tape library of the storage cluster.

9. A method, comprising:
storing hierarchically-organized global configuration information for each node and each tape library resource in a storage cluster to at least one memory accessible by each node of the storage cluster, the storage cluster comprising at least one tape library;
storing, in response to receiving a migration request at any node of the storage cluster and using the global configuration information, data from a high availability (HA) memory to a tape cartridge pool within a first tape library, wherein the tape cartridge pool comprises one or more tape cartridges; and
recalling, in response to receiving a recall request at any node of the storage cluster and using the global configuration information, the data from the tape cartridge pool within the first tape library.

10. The method as recited in claim 9, further comprising storing and accessing the global configuration information for each node and tape resource associated with a tape library separately for each tape library of the storage cluster.

11. The method as recited in claim 9, further comprising storing and accessing the global configuration information for each node and tape library resource in the storage cluster in a distributed manner using a reverse-hierarchy mapping of the node and tape library resources in the storage cluster.

12. The method as recited in claim 9, further comprising:
receiving a request to perform data manipulation at one node of the storage cluster; and
forwarding the request to perform data manipulation to an appropriate node that has access to the data referenced in the request to perform data manipulation based on the global configuration information.

13. The method as recited in claim 12, wherein the request to perform data manipulation is selected from the group consisting of reconciliation, reclamation, import, and export.

14. The method as recited in claim 9, wherein the storing the data from the HA memory to the tape cartridge pool within the first tape library comprises:
storing the data to at least a first tape cartridge of the tape cartridge pool; and
storing metadata information to an index node (inode) of the HA memory, the metadata information being configured to allow a later request for reading the data stored to at least the first tape cartridge to be forwarded to any node of the storage cluster.

15. The method as recited in claim 14, wherein the storing the data from the HA memory to the tape cartridge pool within the first tape library comprises forwarding the migration request from a receiving node to a second node prior to storing the data to at least the first tape cartridge.

16. The method as recited in claim 15, wherein the receiving node uses the global configuration information to identify the second node and a network address for the second node.

17. The method as recited in claim 14, wherein the recalling the data from the tape cartridge pool within the first tape library comprises:
forwarding the recall request to a second node based on the metadata information stored to the inode.

18. The method as recited in claim 9, wherein the global configuration information comprises a mapping that correlates each tape library identifier (ID) to a network address for a distributor node.

* * * * *